(12) United States Patent     (10) Patent No.:   US 12,578,039 B2

Gupta et al.          (45) Date of Patent:     Mar. 17, 2026

(54) TUBE ASSEMBLY AND METHOD OF FORMING SAME

(71) Applicant: Parker-Hannifin Corporation, Cleveland, OH (US)

(72) Inventors: Sahil Gupta, Aurora, OH (US); Michael Mallamaci, North Canton, OH (US); Aidan Brady, Cleveland, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 438 days.

(21) Appl. No.: 18/044,966

(22) PCT Filed: Sep. 10, 2021

(86) PCT No.: PCT/US2021/049861

§ 371 (c)(1),
(2) Date: Mar. 10, 2023

(87) PCT Pub. No.: WO2022/056259

PCT Pub. Date: Mar. 17, 2022

(65) Prior Publication Data

US 2023/0366490 A1     Nov. 16, 2023

Related U.S. Application Data

(60) Provisional application No. 63/077,301, filed on Sep. 11, 2020.

(51) Int. Cl.
*F16L 11/08*         (2006.01)
*B29C 48/151*       (2019.01)
(Continued)

(52) U.S. Cl.
CPC .......... *F16L 11/085* (2013.01); *B29C 48/151* (2019.02); *B29C 48/21* (2019.02); (Continued)

(58) Field of Classification Search
CPC .................................................... F16L 11/085
See application file for complete search history.

(56) References Cited

U.S. PATENT DOCUMENTS 4,242,296 A    12/1980   Bricker
4,676,532 A     6/1987   Gronau et al.
(Continued)

FOREIGN PATENT DOCUMENTS

DE        3700211 A1    7/1988
EP        1321284 A1    6/2003
(Continued)

OTHER PUBLICATIONS

Written Opinion of the International Searching Authority (WO/ISA) corresponding to counterpart International Patent Application PCT/US2021/049861, date of mailing Mar. 15, 2022.
(Continued)

*Primary Examiner* — David R Deal
(74) *Attorney, Agent, or Firm* — Renner, Otto, Boisselle & Sklar, LLP

(57)           ABSTRACT

A method of manufacturing a tube assembly includes surrounding an outer surface of a cured rubber hose with a thermoplastic layer, the cured rubber hose extending along a length between a first end and a second end and having a first shape along its length, the thermoplastic layer surrounding the cured rubber hose along at least a portion of the length. The cured rubber hose surrounded with the thermoplastic layer is molded into a second shape different than the first shape. The cured rubber hose is retained in the second shape by the thermoplastic layer. A tube assembly includes a cured rubber hose and thermoplastic layer surrounding the rubber hose along at least a portion of the length of the cured rubber hose. The cured rubber hose has been cured in a first
(Continued)

shape along its length and the thermoplastic layer retains the cured rubber hose in a second shape.

20 Claims, 6 Drawing Sheets

(51) Int. Cl.

| | |
|---|---|
| *B29C 48/21* | (2019.01) |
| *B29C 48/23* | (2019.01) |
| *B29C 48/34* | (2019.01) |
| *B29C 53/08* | (2006.01) |
| *B29K 21/00* | (2006.01) |
| *B29K 23/00* | (2006.01) |
| *B29K 75/00* | (2006.01) |

(52) U.S. Cl.
CPC .............. *B29C 48/23* (2019.02); *B29C 48/34* (2019.02); *B29C 53/083* (2013.01); *B29K 2021/00* (2013.01); *B29K 2023/12* (2013.01); *B29K 2075/00* (2013.01)

(56) References Cited

U.S. PATENT DOCUMENTS

| | | | |
|---|---|---|---|
| 5,156,699 | A | 10/1992 | Nakano et al. |
| 5,248,171 | A | 9/1993 | Briet |
| 5,447,341 | A | 9/1995 | Hartel et al. |
| 7,229,514 | B2 | 6/2007 | Mason et al. |
| 7,504,151 | B2 | 3/2009 | Emad et al. |
| 8,714,203 | B2 | 5/2014 | Theis |
| 2003/0213524 | A1 | 11/2003 | Henry et al. |
| 2004/0154732 | A1* | 8/2004 | Mason .................. B29C 53/083 156/149 |
| 2013/0000767 | A1 | 1/2013 | Nonaka et al. |
| 2013/0101826 | A1 | 4/2013 | Haug et al. |
| 2014/0124080 | A1 | 5/2014 | Hellfeier et al. |
| 2017/0146158 | A1 | 5/2017 | Harris et al. |
| 2019/0162354 | A1 | 5/2019 | Kaimann et al. |

FOREIGN PATENT DOCUMENTS

| | | | |
|---|---|---|---|
| EP | 2985129 | A1 | 2/2016 |
| GB | 674698 | A | 6/1952 |
| JP | H05169559 | A | 7/1993 |
| JP | H10132154 | A | 5/1998 |
| JP | 2005188577 | A | 7/2005 |
| JP | 2009023256 | A | 2/2009 |
| JP | 4618584 | B2 | 1/2011 |

OTHER PUBLICATIONS

International Search Report (ISR) corresponding to counterpart International Patent Application PCT/US2021/049861, date of mailing Mar. 15, 2022.

International Preliminary Report on Patentability corresponding to counterpart International Patent Application PCT/US2021/049861, date of mailing Dec. 13, 2022.

Written Opinion of the International Preliminary Examining Authority corresponding to counterpart International Patent Application PCT/US2021/049861, date of mailing Aug. 18, 2022.

\* cited by examiner

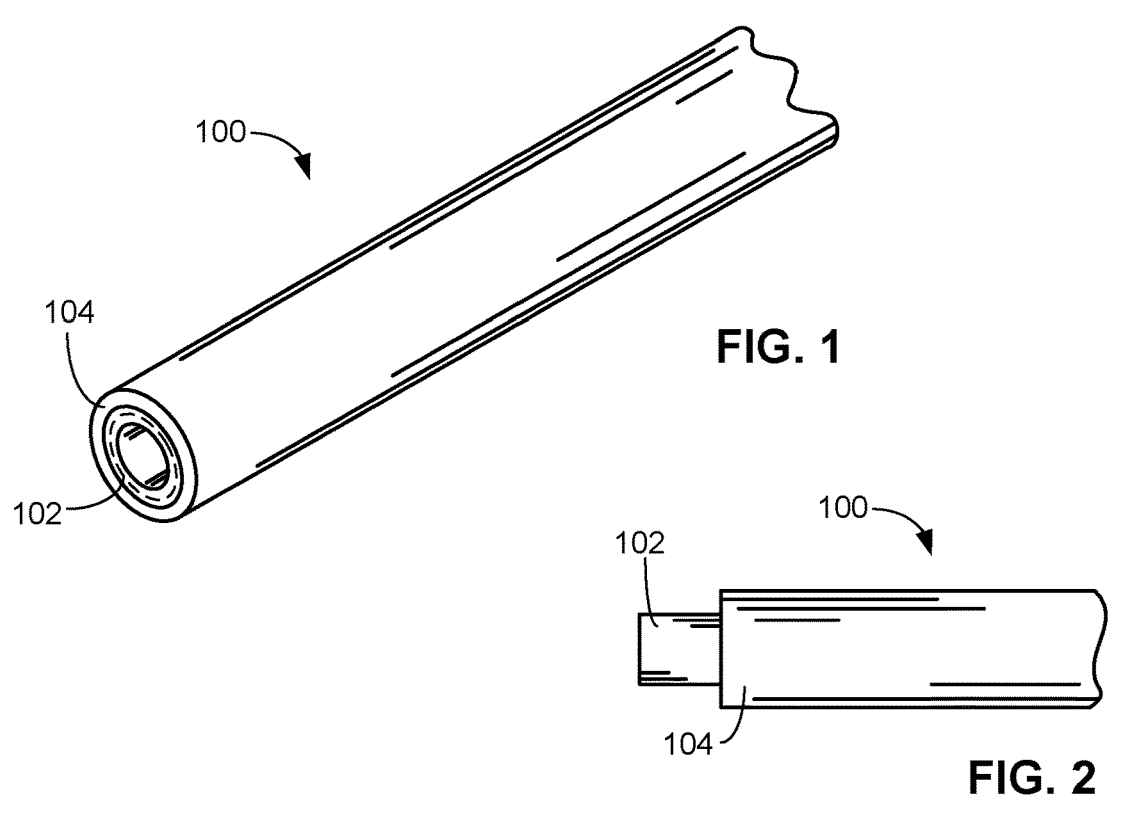
FIG. 1
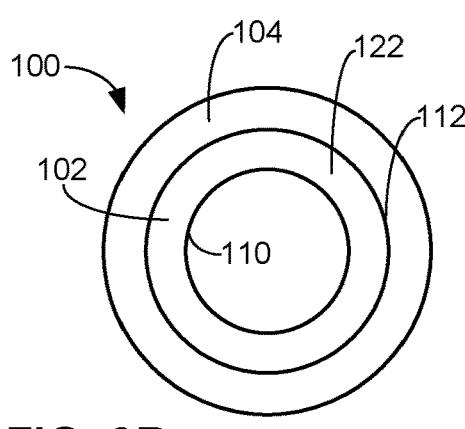
FIG. 2
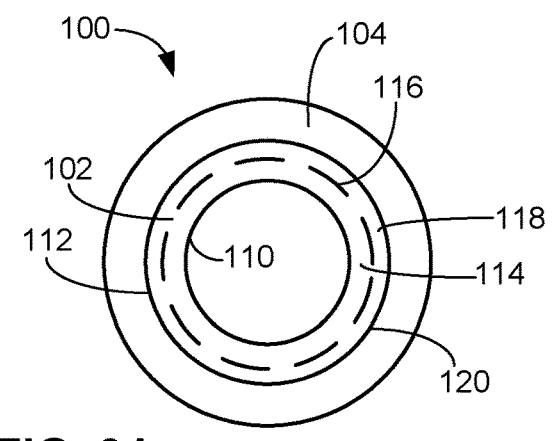
FIG. 3A
FIG. 3B
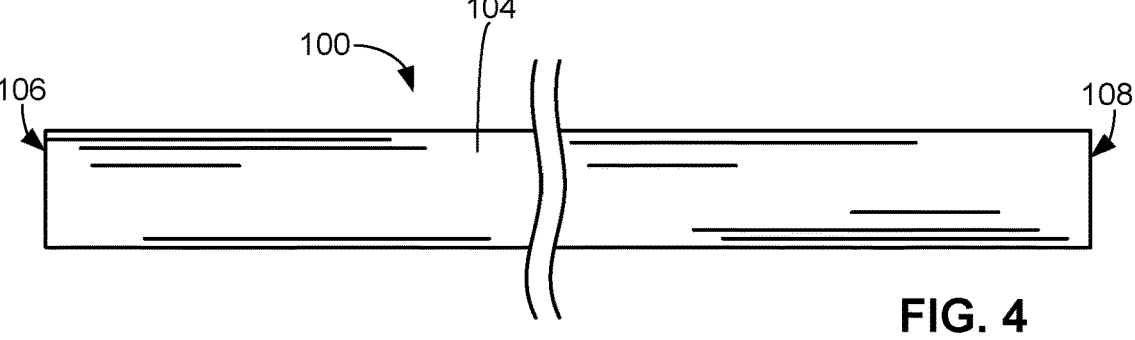
FIG. 4

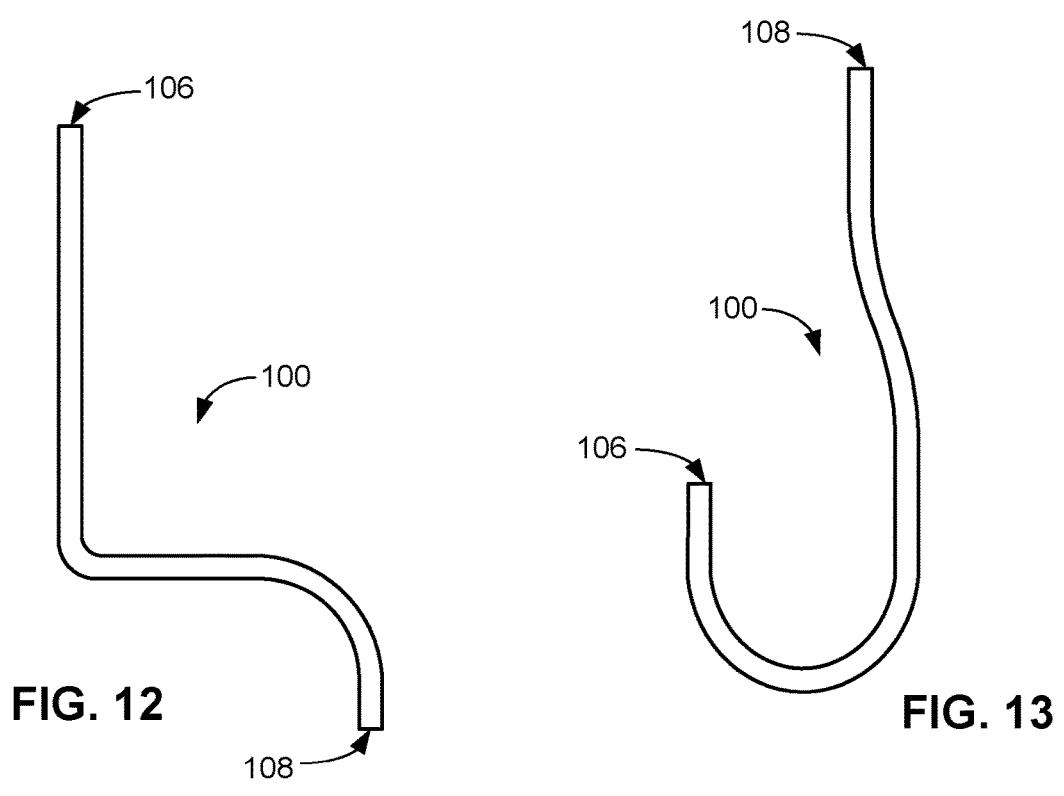
FIG. 12
FIG. 13
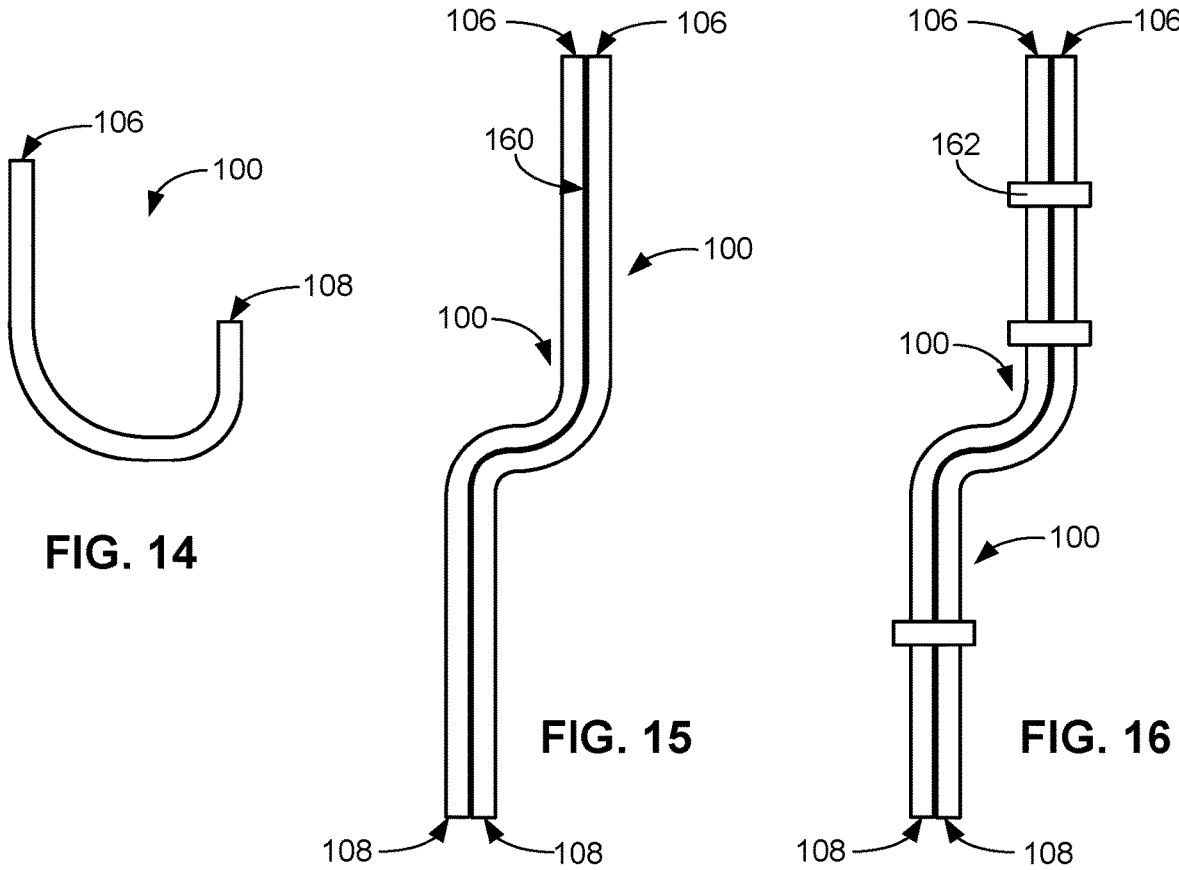
FIG. 14
FIG. 15
FIG. 16

Surround Cured Rubber Hose having First Shape with Thermoplastic Layer 1202

Mold Cured Rubber Hose Surrounded with Thermoplastic Layer into Second Shape 1204

Install Fitting(s) 1206

Retain Cured Rubber Hose in Second Shape with Surrounding Thermoplastic Layer 1208

—1200

—800

TUBE ASSEMBLY AND METHOD OF FORMING SAME

RELATED APPLICATIONS

This application is a national phase of International Application No. PCT/US2021/049861 filed Sep. 10, 2021, which claims the benefit of U.S. Provisional Application No. 63/077,301 filed Sep. 11, 2020, the disclosure of which is hereby incorporated herein by reference in its entirety.

FIELD OF INVENTION

The present disclosure relates to methods of mold-forming tube assemblies, and to tube assemblies formed by the mold-forming methods.

BACKGROUND

Rubber hoses are ubiquitous in applications involving fluid flow and delivery. In many applications, it is desirable to use a hose or hose assembly due to ease of installation in connecting any two points.

Manufacturing a molded rubber hose conventionally involves extruding a first rubber layer over an innermost mandrel, braiding a (polymeric yarn or metal) layer on top of the first rubber layer, extruding a second rubber layer on top of the braided layer, curing the rubber layers, and removing the mandrel. In some embodiments, the above-mentioned curing is a complete cure. In other embodiments, the above-mentioned curing is a partial curing and the hose removed from the mandrel is molded in an autoclave while simultaneously curing it completely.

Further, several applications involve thermally insulating the molded rubber hose. For example, coolant lines, such as those used in automobiles, are in many instances preferred or required to be insulated. An example involves glycol-water coolant fluid circulating at −20° C. inside the rubber hose with the ambient temperature being 22° C. If an insulative thermal layer is not used with the rubber hose, there could be condensed water formed on the rubber hose if the temperature of the outer surface of rubber hose drops below the dew point. The presence of this condensed water layer can be highly undesirable.

A conventional approach to thermally insulating a rubber hose is to cover the rubber hose with a separate, external insulation layer. However, this approach often has disadvantages. Due to a wide range of bend angles (e.g., 5° to 180°), a wide range of bend radiuses, and short section lengths within a molded rubber hose, covering a rubber hose fully with a thermal insulation after it has been molded is inefficient, laborious, and time consuming. An intimate contact between the rubber hose and insulation is also not often achieved in this approach due to the rubber hose not being entirely "sealed" from the environment. Hence the outer surface of hose is exposed to environmental or process fluids that can slowly ingress over time and is susceptible to attack from such fluids. Furthermore, in some cases, an additional outer layer on the thermal insulation such as a tape, film or wire must be used for holding and permanently positioning the insulative layer on the hose and avoid application failures.

SUMMARY OF INVENTION

The present invention provides a method of forming a tube assembly in which an already cured rubber hose is molded into a desired shape using an outer thermoplastic layer. The outer thermoplastic layer is used in a manner to conform the shape of the rubber hose into a desired shape. The outer thermoplastic layer may also provide thermal insulation for the rubber hose.

In accordance with one aspect of the present disclosure, a method of manufacturing a tube assembly includes: surrounding an outer surface of a cured rubber hose with a thermoplastic layer including a thermoplastic material, the cured rubber hose being fully cured and extending along a length between a first end and a second end, the cured rubber having a first shape along its length, the thermoplastic layer surrounding the cured rubber hose along at least a portion of the length of the cured rubber hose; molding the cured rubber hose surrounded with the thermoplastic layer into a second shape along its length, the second shape being different than the first shape of the rubber hose; and retaining the cured rubber hose in the second shape by the thermoplastic layer.

In some embodiments, the cured rubber hose is surrounded by the thermoplastic layer by an extrusion sheathing process.

In some embodiments, the method further includes fully curing an uncured rubber hose to form the cured rubber hose prior to surrounding the outer surface of the cured rubber hose with the thermoplastic layer.

In some embodiments, the thermoplastic layer retains the cured rubber hose at a bend radius below a minimum bend radius of the cured rubber hose while maintaining the cross-sectional shape of the cured rubber hose.

In some embodiments, molding the cured rubber hose surrounded with the thermoplastic layer into a second shape includes: installing the cured rubber hose surrounded with the thermoplastic layer in a mold; and molding the cured rubber hose surrounded with the thermoplastic layer at a molding temperature. In some embodiments, the molding temperature is a temperature within a range of a melting onset temperature of the thermoplastic material and a melting completion temperature of the thermoplastic material. In some embodiments, the molding temperature is a temperature below a melting onset temperature of the thermoplastic material. In some embodiments, the molding temperature is a temperature above a melting completion temperature of the thermoplastic material.

In some embodiments, molding the cured rubber hose surrounded with the thermoplastic layer into a second shape includes providing the cured rubber hose surrounded with the thermoplastic layer at a pre-molding temperature. In some embodiments, the pre-molding temperature of the cured rubber hose surrounded with the thermoplastic layer is a temperature within a range of a melting onset temperature of the thermoplastic material and a melting completion temperature of the thermoplastic material. In some embodiments, the pre-molding temperature of the cured rubber hose surrounded with the thermoplastic layer is a temperature below a melting onset temperature of the thermoplastic material. In some embodiments, the pre-molding temperature of the cured rubber hose surrounded with the thermoplastic layer is a temperature above a melting completion temperature of the thermoplastic material.

In some embodiments, molding the cured rubber hose surrounded with the thermoplastic layer into a second shape includes providing the mold at a pre-molding molding temperature. In some embodiments, the pre-molding temperature of the mold is a temperature within a range of a melting onset temperature of the thermoplastic material and a melting completion temperature of the thermoplastic material. In some embodiments, the pre-molding temperature of the mold is a temperature below a melting onset temperature of the thermoplastic material. In some embodiments, the pre-molding temperature of the mold is a temperature above a melting completion temperature of the thermoplastic material.

In some embodiments, the molding temperature is a temperature in a range from 30° C.-350° C.

In some embodiments, the molding temperature is a temperature in a range from 100° C.-200° C.

In some embodiments, the method further includes installing one or more end-fittings prior to molding the cured rubber hose surrounded with the thermoplastic layer provided in the second shape.

In some embodiments, retaining the cured rubber hose in the second shape by the thermoplastic layer includes cooling the cured rubber hose surrounded with the thermoplastic layer to a temperature below a molding temperature of the thermoplastic layer while maintaining the cured rubber hose surrounded with the thermoplastic layer in the second shape. In some embodiments, the method further includes installing one or more end-fittings prior to cooling the cured rubber hose surrounded with the thermoplastic layer provided in the second shape.

In some embodiments, the thermoplastic layer is bonded to the outer surface of the cured rubber hose along the entire length of the cured rubber hose.

In some embodiments, the thermoplastic layer is bonded to the outer surface of the cured rubber hose along a portion of the length of the cured rubber hose, and the thermoplastic layer is in intimate contact with, but is unbonded to, the outer surface of the cured rubber hose along another portion of the length of the cured rubber hose.

In some embodiments, the thermoplastic layer is in intimate contact with, but is unbonded to, the outer surface of the cured rubber hose along the entire length of the cured rubber hose.

In some embodiments, the cured rubber hose is pre-heated to a temperature of 30° C.-350° C. prior to being covered with the thermoplastic layer.

In some embodiments, the cured rubber hose is pre-heated to a temperature of 100° C.-200° C. prior to being covered with the thermoplastic layer.

In some embodiments, a braid or a coil layer surrounds the cured rubber hose and is disposed between the cured rubber hose and the surrounding the thermoplastic layer.

In some embodiments, the cured rubber hose includes a single rubber layer having an inner surface that defines the innermost surface of the cured rubber hose and an outer surface that constitutes the outer surface of the cured rubber hose.

In some embodiments, the cured rubber hose includes: a first rubber layer having an inner surface that defines the innermost surface of the cured rubber hose; a braid or coil layer surrounding the first rubber layer; and a second rubber layer surrounding the braid or coil layer and including an outer surface that constitutes the outer surface of the cured rubber hose. In some embodiments, the first rubber layer and the second rubber layers include ethylene propylene diene monomer (EPDM), and the braid or coil layer includes a polyester yarn.

In some embodiments, the thermoplastic layer includes polypropylene homopolymer or copolymer or blend or alloy or a combination thereof.

In some embodiments, the thermoplastic layer includes thermoplastic polyurethane homopolymer or copolymer or blend or alloy or a combination thereof.

In some embodiments, the thermoplastic layer is a foam layer. In some embodiments, the thermoplastic layer includes a closed cell foam structure. In some embodiments, the thermoplastic layer includes a semi-closed cell foam structure. In some embodiments, the thermoplastic layer includes an open cell foam structure. In some embodiments, the thermoplastic foam layer includes an outer skin that covers the cell structure.

In some embodiments, the thermoplastic layer is a heat Insulative layer.

In some embodiments, the thermoplastic layer is surrounded by a cover layer.

In some embodiments, the method further includes combining two or more instances of the formed tube through physical contact of the thermoplastic layer using thermal treatment or chemical treatment or mechanical components.

In some embodiments, the method further includes combining two or more instances of the formed tube through non-physical contact of the thermoplastic layer using mechanical components In accordance with another aspect of the present disclosure, a tube assembly includes: a cured rubber hose extending along a length between a first end and a second end; and a thermoplastic layer surrounding the rubber hose along at least a portion of the length of the cured rubber hose, the thermoplastic layer including a thermoplastic material, wherein the cured rubber hose has been fully cured in a first shape along its length and the thermoplastic layer retains the cured rubber hose in a second shape different than the first shape.

In some embodiments, the thermoplastic layer retains the cured rubber hose at a bend radius below a minimum bend radius of the cured rubber hose while maintaining the cross-sectional shape of the cured rubber hose.

In some embodiments, the rubber hose further includes: a first rubber layer having an inner surface that defines the innermost surface of the cured rubber hose; a braid or coil layer surrounding the first rubber layer; and a second rubber layer surrounding the second braid or coil layer.

In some embodiments, the first rubber layer and the second rubber layer include ethylene propylene diene monomer (EPDM), and the braid or coil layer is made using a polyester yarn.

In some embodiments, the thermoplastic layer includes a polypropylene homopolymer or copolymer or blend or alloy or a combination thereof.

In some embodiments, the thermoplastic layer includes a thermoplastic polyurethane homopolymer or copolymer or blend or alloy or a combination thereof.

In some embodiments, the thermoplastic layer is a foam layer. In some embodiments, the thermoplastic layer includes a closed cell foam structure. In some embodiments, the thermoplastic layer includes a semi-closed cell foam structure. In some embodiments, the thermoplastic layer includes an open cell foam structure. In some embodiments, the thermoplastic layer includes an outer skin that covers the cell structure.

In some embodiments, the thermoplastic layer is a heat Insulative layer.

In some embodiments, the thermoplastic layer is surrounded by a cover layer.

In accordance with another aspect of the present disclosure, a combined tube assembly including two or more instances of the tube assembly. In some embodiments, at least two of the two or more assemblies are combined through physical contact of their respective thermoplastic layers. In some embodiments, at least two of the two or more assemblies are combined through non-physical contact of their respective thermoplastic layers using mechanical components.

The foregoing and other features of the invention are hereinafter described in greater detail with reference to the accompanying drawings.

BRIEF DESCRIPTION OF THE DRAWINGS

FIG. 1 is an oblique view of an exemplary tube assembly.

FIG. 2 is a side elevational, cut-away view of the tube assembly of FIG. 1.

FIG. 3A is a cross-sectional view of the tube assembly of FIG. 1.

FIG. 3B is a cross-sectional view of another exemplary embodiment of a tube assembly.

FIG. 4 is a side elevational view of the tube assembly of FIG. 1.

FIGS. 12-16 are top views of exemplary tube assemblies.

DETAILED DESCRIPTION

Figure 5:
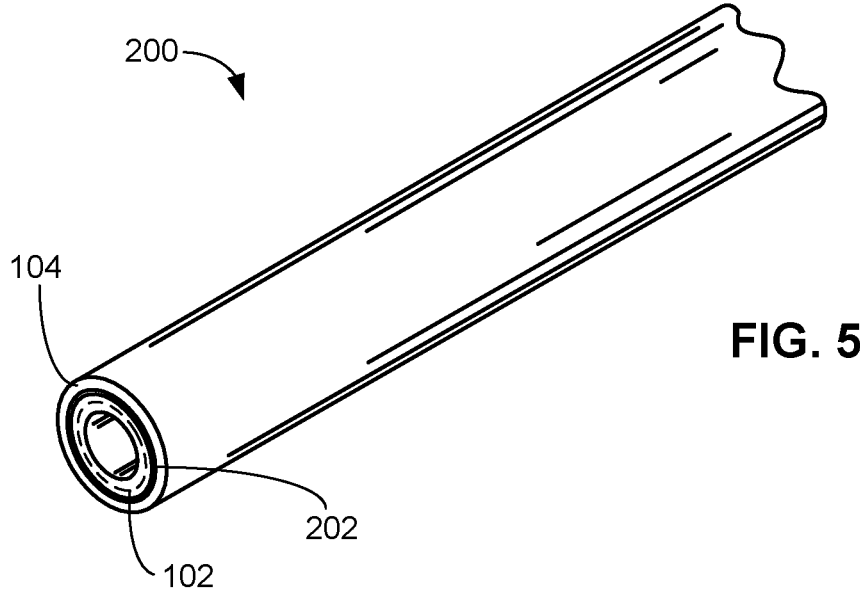
FIG. 5 is an oblique view of another exemplary tube assembly.

Embodiments of the present invention will now be described with reference to the drawings, wherein like reference numerals are used to refer to like elements throughout. It will be understood that the figures are not necessarily to scale. While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Certain terminology may be employed in the description to follow for convenience rather than for any limiting purpose. For example, the terms "inner" and "outer" referring, respectively, to directions toward and away from the center of the referenced element, and the terms "radial" and "axial" referring, respectively, to directions perpendicular and parallel to the central longitudinal axis of the referenced element. Terminology of similar import other than the words specifically mentioned above likewise is to be considered as being used for purposes of convenience rather than in any limiting sense.

The terms "surrounding" and "surrounds" when used in reference to a given hose, tube, or layer relative to another hose, tube, or layer refers to the relative position as viewed in the cross-section of the tube or layer, and is used interchangeably with "radially surrounding".

The terms, "shaped," "formed," and "molded" are used interchangeably in the below description.

The terms "hose" and "tube" are used interchangeably in the below description. It will be appreciated that while the hose or tube may in some embodiments have a circular cross-sectional shape, in other embodiments the hose or tube may have a non-circular cross-sectional shape. Non-limiting cross-sectional shapes include an oval, elliptical, triangular, square, pentagon, hexagon, other polygonal shape, and the like.

The terms "cured" and "vulcanized" are used interchangeably in the below description. The terms "cured" and "vulcanized" as used in the present disclosure in connection with the rubber hose, unless specifically described as otherwise, refers to a complete (full) curing/vulcanizing of the rubber hose, and is distinguished from being partially cured/vulcanized.

Referring now to the drawings in detail and initially to FIGS. 1-4, an exemplary tube assembly 100 is shown. The tube assembly 100 includes a cured rubber hose 102 and a thermoplastic layer 104 surrounding the cured rubber hose. In some embodiments, the thermoplastic polymer is a foamed thermoplastic polymer. The tube assembly extends along a length thereof between a first end 106 and a second end 108. The cured rubber hose 102 extends between the first end 106 and the second end 108, and the thermoplastic layer 104 surrounds the cured rubber hose and extends along the length of the tube assembly. In some embodiments, the thermoplastic layer 104 extends along the entire length of the cured rubber hose 102 between the first end and the second end. In other embodiments, the thermoplastic layer 104 extends along a portion of the length of the cured rubber hose between the first end and the second end. For example, FIG. 2 shows an embodiment in which the cured rubber hose 102 is exposed along a portion of the length of the tube assembly 100.

The cured rubber hose 102 has an inner surface 110 and outer surface 112. The inner surface 110 is radially spaced apart from the outer surface 112. The inner surface 102 of the cured rubber hose may in some embodiments define the innermost surface of the tube assembly. The cured rubber hose may also be referred to the inner hose of the tube assembly. The dimensions of the cured rubber hose 102 may be any suitable dimensions, and may be provided in accordance with the particular application of the hose. For example, in some embodiments, the inner diameter of the cured rubber hose may be a diameter falling in the range of 0.25 cm to 15 cm. In some embodiments, the outer diameter of the cured rubber hose may be a diameter falling the range of 0.3 cm to 17 cm. In some embodiments, the radial thickness of the cured rubber hose between the inner surface 110 and the outer surface 112 may be a thickness falling in the range of 0.1 cm to 3 cm. It will be appreciated that in other embodiments, one or more of the inner diameter, the outer diameter, and the radial thickness may fall outside the above-mentioned exemplary ranges.

The cured rubber hose 102 is a hose that has been fully cured in a first shape prior to surrounding the cured rubber hose with the thermoplastic layer. As a result of forming the tube assembly, the thermoplastic layer is provided (e.g., molded) such that it retains the cured rubber hose in a second shape different than the first shape. That is, the thermoplastic layer surrounds and applies a force to the cured rubber hose that causes the cured rubber hose to be retained in a shape other than the shape in which the rubber hose was cured. Without the force applied by the thermoplastic layer, the cured rubber hose would return to the first shape. The "shape" as described in the context of the first shape and the second shape of the cured rubber hose and tube assembly refers to the overall three-dimensional form of the hose and assembly. The shape is that of the hose and assembly in three-dimensional space as it extends between the first end 106 and second end 108. The shape may be defined by the presence and/or absence of curves in the hose extending between the first end 106 and second end 108.

The cured rubber hose 102 may have any suitable construction. With reference to FIG. 3A, in some embodiments, the cured rubber hose may include a first rubber layer 114 having an inner surface that defines the innermost surface of the cured rubber hose (e.g., inner surface 110), a braid and/or coil layer 116 surrounding the first rubber layer, and a second rubber layer 118 surrounding the braid and/or coil. The innermost surface of the cured rubber hose may constitute the inner layer of the tube assembly. With reference to FIG. 1, in some embodiments, the outer surface of the second rubber layer 118 (e.g., outer surface 112), which may constitute the outer layer of the cured rubber hose, contacts the inner surface 120 of the thermoplastic layer.

It will be appreciated that in other embodiments, the tube assembly 100 may include a cured rubber hose having a different construction. Another exemplary embodiment of the cured rubber hose 102 as included in the tube assembly 100 is shown in FIG. 3B. As shown, the cured rubber hose 102 includes a single rubber layer 122. In still other embodiments, the cured rubber hose 102 may include any suitable number and arrangement of rubber layers and any suitable number and arrangement of braid and/or coil layers.

The rubber material of the cured rubber hose 102 can be chosen from, for example, natural or synthetic rubber such as a fluoropolymer, chlorosulfonate, polybutadiene, butyl rubber, chloroprene, neoprene, nitrile rubber, natural polyisoprene, synthetic polyisoprene, halogenated butyl rubber, hydrogenated butyl rubber, and buna-N, copolymer rubbers such as ethylene-propylene (EPR), ethylene-propylene-diene monomer (EPDM), nitrile-butadiene (NBR), and styrene-butadiene (SBR), polyacrylate rubber, or combinations of two or more thereof. The term "synthetic rubbers" also should be understood to encompass materials that may be classified broadly as thermosetting elastomers such as polyurethanes, silicones, fluorosilicones, styrene-isoprene-styrene (SIS), fluoroelastomers such as FKM, perfluoroelastomers such as FFKM, chlorosulfonated polyethylene, and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" encompasses materials exhibiting rubber-like properties of compliancy, resiliency or compression deflection, low compression set, flexibility, and an ability to recover after deformation, i.e., stress relaxation.

In those embodiments in which the cured rubber hose includes more than one rubber layer, the respective rubber layers may be the same material or different respective materials.

The braid or coil layer can be made from materials including, but not limited to, fibers and yarns such as polyester fibers, polyaramid fibers, carbon fibers, glass fibers, mineral fibers; uncoated metal and metal alloy wires such as steel, copper, brass; or metal and metal alloy wires with additional coatings such as zinc.

In one example, the cured rubber hose has a construction shown in FIG. 3A, with the two rubber layers each being formed of ethylene propylene diene monomer (EPDM) and the braided or coiled layer being formed of polyester yarn.

The thermoplastic material of the thermoplastic layer 104 can be chosen from, for example, the family of polymers including, but not limited to, polyolefins, polyam ides, polyesters, polyurethanes, polyaramids, fluoropolymers, polysulfones, polysulfides, polyketones, polyethers, polyether ketones, polyanhydrides, polyimides, liquid crystal polymers, thermoplastic vulcanizates (TPV), ionomers, thermoplastic elastomers (TPE). In other embodiments, a combination of the above listed polymers involving homopolymers, copolymers, composites, blends or alloys can be used. In one exemplary embodiment, the thermoplastic layer is formed using a polypropylene homopolymer or copolymer or blend or alloy or a combination thereof. In another exemplary embodiment, the thermoplastic layer is formed using a thermoplastic polyurethane homopolymer or copolymer or blend or alloy or a combination thereof.

The thermoplastic material may be a foamed material. In some embodiments, the foamed thermoplastic material has a closed-cell morphology. The closed-cell morphology may provide protection to the covered hose against ingression of environmental fluids. In other embodiments, the foamed thermoplastic material has a semi closed-cell structure. In other embodiments, the foamed thermoplastic material has an open-cell structure. In any of the above embodiments, the foamed thermoplastic material may include an outer skin or an additional outer layer that covers the cells of the foamed thermoplastic material.

The foamed thermoplastic material may in some embodiments have at least 20% density reduction relative to the corresponding density of the thermoplastic material in the un-foamed state. "Reduction in density" or "density reduction" may be understood to mean a percentage reduction in the density of a foamed material, based on the density of the non-foamed starting material measured under the same environmental conditions. In some examples, the foamed thermoplastic material has at least 40% density reduction. In some examples, the foamed thermoplastic material has anywhere from 40% to 99% density reduction relative to the corresponding density of the thermoplastic material in the un-foamed state. In other examples, the foamed thermoplastic material has anywhere from 60% to 99% density reduction relative to the corresponding density of the thermoplastic material in the un-foamed state.

In some embodiments, the cellular morphology of the foamed thermoplastic material is classified as macrocellular characterized by an average cell diameter 100 micrometers ($\mu$m) or greater. In another embodiment, the cellular morphology of the foamed thermoplastic material is classified as microcellular characterized by an average cell diameter between 1 $\mu$m and 100 $\mu$m. In yet another embodiment, the cellular morphology of the foamed thermoplastic polymer material is classified as ultramicrocellular characterized by an average cell diameter anywhere from 0.1 $\mu$m to 1 $\mu$m. In yet another embodiment, the cellular morphology of the foamed thermoplastic polymer material is classified as nanocellular characterized by an average cell diameter anywhere from 0.001 $\mu$m to 0.1 $\mu$m.

In some embodiments, the thermoplastic material may include one or more additives. Examples include, but are not limited to, one or more plasticizers, compatibilizers, anti-oxidants, UV stabilizers, radiopaque compounds, colorants (pigments or dyes), flow modifiers, impact modifiers, elastomers (such as in thermoplastic elastomers), cross-linked rubber (such as in thermoplastic vulcanizates), lubricants, releasing agents, coupling agents, cross-linking agents, dispersing agents, foam nucleating agents, flame retardants, reinforcing metals, minerals, nucleating agents, fillers (such as talc, clay, mica, graphite, carbon black, carbon nanotubes, graphene, silica, POSS, powdered metals, powdered ceramics, metal or ceramic based nanowires, glass fibers etc.), and/or a combination of any of the listed additives. The one or more additives may be combined with the thermoplastic material prior to formation of the thermoplastic layer.

The thermoplastic layer may be bonded to the cured rubber hose along at least a portion of the length of the tube assembly. For example, in some embodiments, the thermoplastic layer is bonded to the cured rubber hose along the entire length of the thermoplastic layer. This length may be the entire length of the tube assembly. In other embodiments, the thermoplastic layer is bonded to the cured rubber hose at one or more portions along the length of the thermoplastic layer, the sum of the one or more portions being less than the entire length of the thermoplastic layer. For example, the thermoplastic layer may extend the entire length of the tube assembly, but may only be bonded at one or more portions along the length. In some embodiments, bonding is achieved by the use of external adhesives, glue, compatibilizers or another intermediary layer between the rubber hose and the insulative thermoplastic layer. In other embodiments, bonding may be achieved thermally without the use of any adhesives, glue, or another intermediary layer. For example, bonding may be achieved by pre-heating the cured rubber hose before it is covered with the insulative thermoplastic layer. The degree of bonding can also be controlled by the pre-heating of the rubber hose. In other embodiments, bonding is achieved by surface functionalization to the cured rubber hose using techniques such as exposure to plasma, ozone, corona, chemical, or laser etching.

In other embodiments, the thermoplastic layer may be in intimate contact with, but not bonded to, the cured rubber hose. In such embodiments, the thermoplastic layer may be provided along the entire length of, or a portion of the length of, the tube assembly. This may allow for the cured rubber hose to be moved relative to the thermoplastic layer (e.g., the cured rubber hose may slide within the outer thermoplastic layer), enabling ease of installing external components or accessories such as fittings, brackets and connectors into or onto one or both of the ends of the rubber hose.

The thermoplastic layer may in some embodiments exhibit insulative properties. For example, the thermoplastic layer may have a lower thermal conductivity as compared with the cured rubber hose. "Thermal conductivity" may be understood to mean the effective thermal conductivity of a material that governs the overall heat transfer from one end of the material to the other. Thermal conductivity may be expressed in watts per meter-kelvin W/(m-K). In embodiments in which the thermoplastic layer is provided as a foamed material, the thermal conductivity of the foamed material may be further reduced relative to the corresponding values of the thermoplastic material in the un-foamed state. In embodiments in which the thermoplastic layer is a foam layer, the morphology of the foam structure may further improve the insulative properties (such as lowering the thermal conductivity) as compared to the same or similar makeup of the thermoplastic layer if it was not provided as a foamed layer.

In some embodiments, the thermoplastic layer may exhibit one or more other properties such as flame retardancy, vibration dampening, noise dampening, hydrolysis resistance, wear resistance, and/or abrasion resistance.

The radial thickness of the thermoplastic layer may be any suitable thickness, and may be provided in accordance with the particular application of the hose. For example, in some embodiments, the radial thickness of the thermoplastic layer may be a thickness falling in the range of 0.1 cm to 10 cm. It will be appreciated that in other embodiments the radial thickness may fall outside the above-mentioned exemplary ranges.

In some embodiments, the thermoplastic layer is constituted by a single layer. In other embodiments, the thermoplastic layer is constituted by two or more layers that collectively form the thermoplastic layer. In such embodiments, the two or more layers may be the same or different thermoplastic materials.

Figure 6:
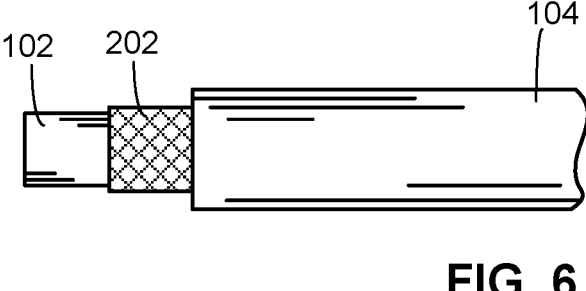
FIG. 6 is a side elevational, cut-away view of the tube assembly of FIG. 5.
Figure 7:
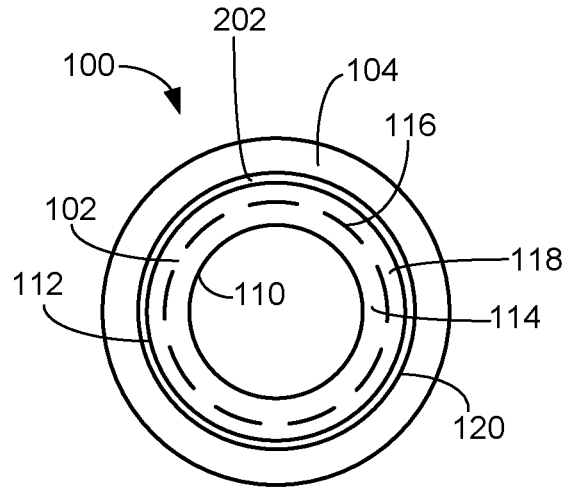
FIG. 7 is a cross-sectional view of the tube assembly of FIG. 5.

Referring now to FIGS. 5-7, an additional exemplary tube assembly 200 is shown. The tube assembly is similar to the tube assembly 100 in that it includes a cured rubber hose 102 and a thermoplastic layer 104 surrounding the cured rubber hose. The description of the cured rubber hose 102 and thermoplastic layer 104 as described above is fully applicable to tube assembly 200, and reference is made to the above description. In addition, a reinforcement layer 202 surrounds the cured rubber tube and is disposed between the cured rubber hose 102 and the thermoplastic layer 104. In some embodiments, the reinforcement layer includes a braid or a coil that contacts the inner surface of the foamed thermoplastic layer and/or the outer surface of the cured rubber hose. The braid or coil layer can be made from materials including, but not limited to, fibers and yarns such as polyester fibers, polyaramid fibers, carbon fibers, glass fibers, mineral fibers; uncoated metal and metal alloy wires such as steel, copper, brass; or metal and metal alloy wires with additional coatings such as zinc.

Consistent with that which is shown in FIG. 4, the tube assembly 200 extends along a length thereof between a first end 106 and a second end 108. In some embodiments, the braid or coil layer 202 surrounds the cured rubber hose and extends along the entire length between the first end and the second end. In other embodiments, the braid or coil layer 202 surrounds the cured rubber hose and extends along a portion of the length between the first end 106 and the second end 108.

The thermoplastic layer may be bonded to the reinforcement layer along at least a portion of the length of the tube assembly. For example, in some embodiments, the thermoplastic layer is bonded to the reinforcement layer along the entire length of the thermoplastic layer. This length may be the entire length of the tube assembly. In other embodiments, the thermoplastic layer is bonded to the reinforcement layer at one or more portions along the length of the thermoplastic layer, the sum of the one or more portions being less than the entire length of the thermoplastic layer. In some embodiments, bonding is achieved by the use of external adhesives, glue, compatibilizers or another intermediary layer between the reinforcement layer and the insulative thermoplastic layer.

Figure 8:
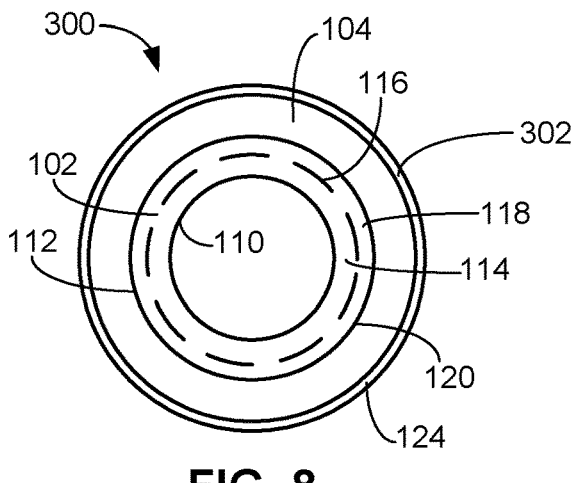
FIG. 8 is a cross-sectional view of another exemplary embodiment of a tube assembly.
Figure 9:
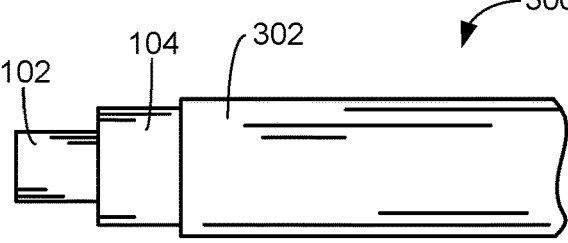
FIG. 9 is a side elevational, cut-away view of the tube assembly of FIG. 8.
Figure 10:
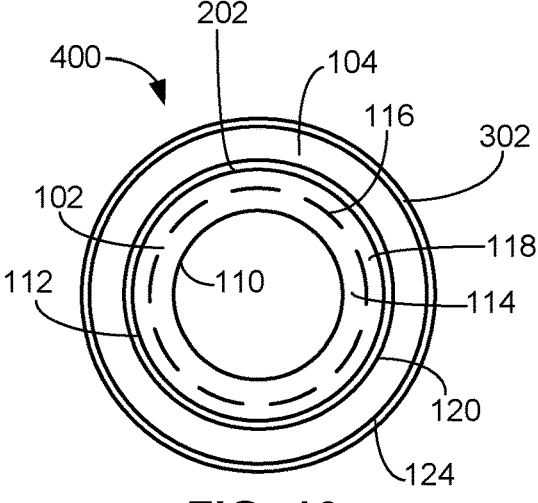
FIG. 10 is a cross-sectional view of another exemplary embodiment of a tube assembly.
Figure 11:
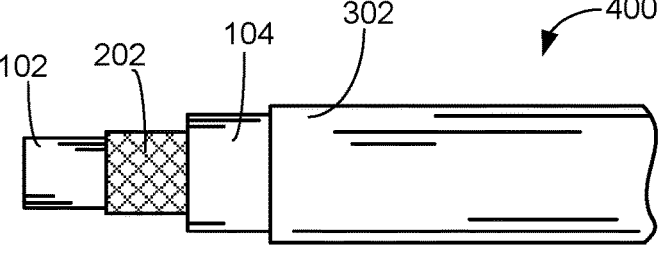
FIG. 11 is a side elevational, cut-away view of the tube assembly of FIG. 10.

Referring now to FIGS. 8-11, additional exemplary tube assemblies 300, 400 are respectively shown. The tube assembly 300 shown in FIGS. 8 and 9 is similar to tube assembly 100, and the tube assembly 400 shown in FIGS. 10 and 11 is similar to the tube assembly 200; but each of the tube assemblies 300, 400 additionally include a cover layer 302, 402 that surrounds the thermoplastic layer. In some embodiments, the cover layer 302, 402 is in contact with the outer surface 124 of the thermoplastic layer. The cover layer 302, 402 may be any suitable material. In some embodiments, the cover layer is made from materials including, but not limited to polyurethane, polyamide, polyolefin, silicone, polyester, fluoropolymer, thermoplastic elastomer, polyvinyl chloride, polyurethane, natural rubber, synthetic rubber, or a copolymer or blend of two or more thereof. In some embodiments, the cover layer is made from a thermoplastic material. In some embodiments, the cover layer is made from a thermoplastic polyurethane. In some embodiments, the cover layer is made from a synthetic or natural rubber.

As described above, the tube assembly 100, 200, 300, 400 extends along its length between a first end and a second end. The cured rubber hose is a hose that has been fully cured in a first predetermined shape prior to surrounding the cured rubber hose with the thermoplastic layer. The shape of the cured rubber hose prior to applying the thermoplastic layer is regarded as the first shape. In some embodiments, the first shape of the cured rubber hose is a linear shape (e.g., the cured rubber hose is a straight hose). In other embodiments, the first shape of the cured rubber hose includes one or more curves along its length. The thermoplastic layer is provided (e.g., molded) such that it retains the cured rubber hose in a second shape different than the first shape. FIGS. 12-16 show exemplary second shapes of the tube assembly 100. It will be appreciated that tube assemblies 200, 300, 400 can be provided in similar exemplary shapes. The tube assembly 100, 200, 300, 400 may include at least one curved portion along its length. As shown, the tube assembly may include one or more linear portions and one or more curved portions.

A rubber hose exhibits a minimum bend radius below which it is not recommended to bend the rubber hose, for any bend angle, otherwise the rubber hose can undergo kinking or an undesirable dimensional change that decreases the process fluid flow rate during application. The kinking or dimensional change causes the cross-section of the hose to be altered, which will affect the flow within the hose. As an example, in an embodiment where the hose has a circular cross-section, the circularity of the hose will become undesirably modified when the hose is bent below the minimum bend radius. For hoses that have a different cross-sectional shape, the same undesirable result can occur.

The specific minimum bend radius of a cured rubber hose depends upon factors such as the construction/design, materials used for construction, and the dimensions of the cured rubber hose. In many examples, the minimum bend radius of a cured rubber hose is in the range of 10 to 12 times the inner diameter of the hose. For example, a cured rubber hose constructed with an inner first rubber layer, a fiber braid layer, and an outer second rubber layer, the cured rubber hose having an inner diameter of 0.25 inch (0.635 cm) and having a 0.138 inch (0.35 cm) wall thickness, may have a minimum bend radius of 2.5 inch (6.35 cm). As another example, a cured rubber hose constructed with an inner first rubber layer, a fiber braid layer, and an outer second rubber cover, the cured rubber hose having an inner diameter of 1 inch (2.54 cm) and having a 0.170 inch (0.43 cm) wall thickness, may have a minimum bend radius of 12 inches (30.48 cm).

However, with the thermoplastic layer provided (e.g., molded) such that it retains the cured rubber hose in a second shape different than the first shape, the thermoplastic layer can facilitate bending of the cured rubber hose during the molding process below its recommended minimum bend radius without kinking or significant dimensional change to the cross-sectional shape of the hose. In such a case it is the thermoplastic layer itself that forcibly imposes a deformation on the confined rubber hose and enables a smaller bend radius of rubber hose. In embodiments in which the thermoplastic layer is bonded to the cured rubber hose, the bond may assist in imposing the deformation of the cured rubber hose. In the absence of a bond between the rubber layer and thermoplastic layer, a bend radius smaller than the recommended value for rubber hose can still be achieved by the thermoplastic layer imposing deformation on the rubber hose, but it is possible that delamination between the layers may occur at higher percentages below the minimum bend radius of the cured rubber hose.

The dimensional change to the cross-sectional of the cured rubber hose may be measured based on a change in the overall cross-sectional shape of the cured rubber hose between an unbent state (no force applied by the thermoplastic layer) and a bent state (force applied by the thermoplastic layer). One way to measure a change in the cross-sectional shape is to measure a change in a cross-sectional dimension of the cured rubber hose. This cross-sectional dimension may be the cross-sectional dimension extending parallel to the bend radius.

A change in the cross-sectional shape can be measured by comparing the cross-sectional dimension when the cured rubber hose is in an unbent state as compared to the cross-sectional dimension when the cured rubber is in the bent state. The cross-sectional shape of the tube may be considered to be maintained when the change in such cross-sectional dimension is no more than 10%.

In some embodiments, the thermoplastic layer retaining the cured rubber hose allows for the cured rubber hose to be bent and retained at a bend radius below the minimum bend radius of the cured rubber hose while maintaining the cross-sectional shape of the cured rubber hose. In some embodiments, the thermoplastic layer retaining the cured rubber hose allows for the cured rubber hose to be bent and retained at a bend radius at least 5% below the minimum bend radius of the cured rubber hose while maintaining the cross-sectional shape of the cured rubber hose. In other embodiments, the thermoplastic layer retaining the cured rubber hose allows for the cured rubber hose to be bent and retained at a bend radius at least 10% below the minimum bend radius of the cured rubber hose while maintaining the cross-sectional shape of the cured rubber hose. In other embodiments, the thermoplastic layer retaining the cured rubber hose allows for the cured rubber hose to be bent and retained at a bend radius up to 20% below the minimum bend radius of the cured rubber hose while maintaining the cross-sectional shape of the cured rubber hose. In some embodiments, the cured rubber hose is bent and retained at a bend radius in a range of 1% to 70% below the minimum bend radius of the cured rubber hose while maintaining the cross-sectional shape of the cured rubber hose. In other embodiments, the cured rubber hose is bent and retained at a bend radius in a range of 1% to 50% below the minimum bend radius of the cured rubber hose while maintaining the cross-sectional shape of the cured rubber hose. In other embodiments, the cured rubber hose is bent and retained at a bend radius in a range of 1% to 35% below the minimum bend radius of the cured rubber hose while maintaining the cross-sectional shape of the cured rubber hose. In other embodiments, the cured rubber hose is bent and retained at a bend radius in a range of 1% to 30% below the minimum bend radius of the cured rubber hose while maintaining the cross-sectional shape of the cured rubber hose.

In an example, a cured rubber hose constructed with an inner first rubber core layer, a fiber braid layer, and an outer second rubber layer having 0.25 inch inner diameter and 0.138 inch wall thickness with a prescribed minimum bend radius of 2.5 inch can instead be bend to a radius of 1.63 inch with the thermoplastic layer bonded to the outer surface of the cured rubber hose. This represents a decrease of 35% from the minimum ben radius of rubber hose alone.

With specific reference to FIGS. 15 and 16, in some embodiments the formed tube assembly can be a part of combined assembly. The combined assembly may include two or more hoses, at least one of which is a tube assembly 100, 200, 300, 400 as described above. In some embodiments, relative positioning of at least a portion of the tube assemblies can be accomplished by combining two or more instances of the formed tube assembly though physical contact of the thermoplastic layer using thermal treatment or chemical treatment. For example, the joining can be accomplished by thermally welding the tube assemblies through their outer thermoplastic layers by locally heating the thermoplastic layers slightly below or above the melting point of the thermoplastic resin and simultaneously applying external pressure to bond or fuse the insulative layers. Other methods for joining the individual formed rubber hoses through the outer thermoplastic insulative layer include vibration welding, ultrasonic welding, laser welding or their variations and combinations. Still other methods for joining the individual hoses includes the application of adhesive, glue or other chemicals to the outer surface of their respective insulative layer. FIG. 15 shows an example in which the respective thermoplastic layers of the tubular assemblies are joined at a contact point 160. In other embodiments, relative positioning of at least a portion of the tube assemblies can be accomplished by combining two or more instances of the formed tube assembly using mechanical components such as brackets and mounts. FIG. 16 shows an example in which brackets 162 are used. When two or more instances of the tube assemblies are combined using mechanical components, the tube assemblies may be in physical contact with one another or may not be in physical contact with one another.

As described above, for a given tube assembly, the thermoplastic layer may be bonded to the cured rubber hose along at least a portion of the length of the tube assembly. In some embodiments, the thermoplastic layer is bonded to the cured rubber hose along the entire length of the tube assembly. In other embodiments, the thermoplastic layer is bonded to the cured rubber hose along one or more portions of the tube assembly. This may also be referred to as selective bonding. For example, the thermoplastic layer can be selectively removed at the unbonded portion to create sections without any thermal insulation exposing the rubber hose. Those sections can be utilized to mount external components on the hose such as temperature sensors, pH sensors, molded fittings and connectors, T-joints, tooth rings, brackets, and the like. In another example, the thermoplastic layer may be bonded to the outer surface of the cured rubber hose along a portion of the length of the cured rubber hose, but may be unbonded (but in intimate contact with) the outer surface of the cured rubber hose proximate one or both of the first and second ends of the tube assembly. This may allow for selective removal of the thermoplastic layer proximate the first and/or second end of the tube assembly for mounting of the external components to the cured rubber tube.

In other embodiments, the thermoplastic layer may be in intimate contact with, but not bonded to, the cured rubber hose along the entire length of the tube assembly. This may allow for the cured rubber hose to be move relative to the thermoplastic layer (e.g., the cured rubber hose may slide within the cured rubber hose), enabling ease of installing external components or accessories such as fittings, brackets and connectors into or onto one or both of the ends of the rubber hose.

Figure 17:
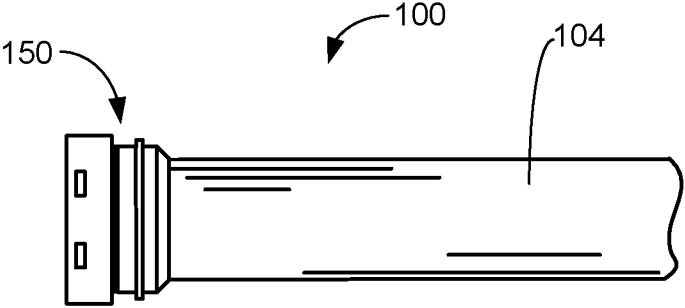
FIGS. 17 and 18 are side elevational views of exemplary tube assemblies.
Figure 18:
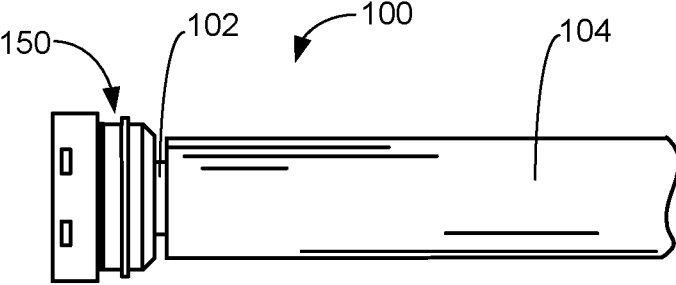

Turning now to FIGS. 17 and 18, exemplary embodiments are shown in which the tube assembly includes an end-fitting 150. The tube assembly may include one or more end-fittings. End-fittings enable the user to connect the tube assembly to other pipes, tubes, hoses or components through which the process fluid is circulated. In the exemplary embodiment shown in FIG. 17, a portion of the cured rubber hose is exposed proximate the first end and the end-fitting is coupled to the cured rubber hose. In the exemplary embodiment shown in FIG. 18, the end-fitting is coupled to the cured rubber hose and fit over a portion of the thermoplastic layer proximate the first end. As described below, installation of the end-fitting as shown in FIG. 18 may be conducted upon molding of the tube assembly into the second shape and prior to cooling the thermoplastic layer. This may prevent the outer layer from being subjected to hoop and/or circumferential stresses which could accelerate the failure of the outer layer in application for example by developing premature cracks. FIGS. 17 and 18 show exemplary second shapes of the tube assembly 100. It will be appreciated that tube assemblies 200, 300, 400 can be provided in similar embodiments.

The tube assembly 100, 200, 300, 400 of the present disclosure can be used in any suitable application for a molded rubber hose, and in particular applications where a molded rubber hose with thermal insulation is preferred or needed. Examples include, but are not limited to, hydraulic hose and assemblies, coolant lines and assemblies, fuel (CNG, LPG, Biodiesel) lines and assemblies, vapor emission hose and assemblies, air brake lines and assemblies, air conditioning lines and assemblies, power steering hose and assemblies, evaporator and heater hose and assemblies, refrigerant hose and assemblies, concrete pump hose and assemblies, and pneumatic lines and assemblies, chemical transfer lines and assemblies, exhaust lines and assemblies.

Figure 19:
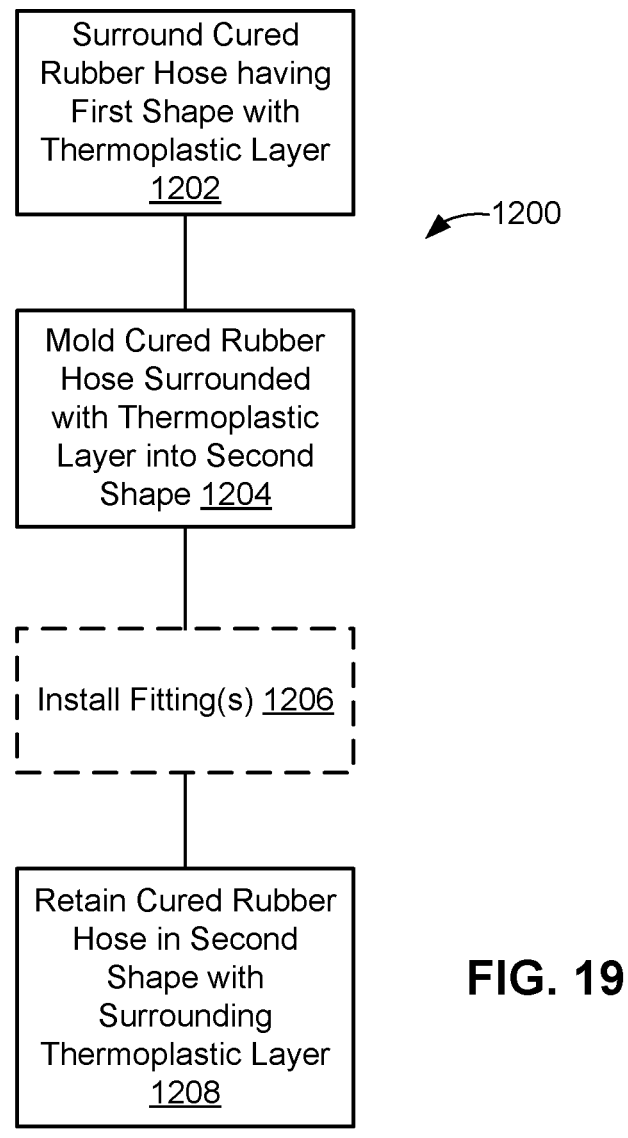
FIG. 19 is a flow diagram of a method of forming a tube assembly.

Referring now to FIG. 19, an exemplary method for forming the tube assembly is shown at 1200. The exemplary method may be used for forming any of the embodiments of the tube assembly described above.

At step 1202, a cured rubber hose is surrounded by a thermoplastic layer along at least a portion of a length of the cured rubber hose. The cured rubber hose has been completely (fully) cured/vulcanized prior to step 502 and possesses a first shape along its length. This curing/vulcanization forms the cured rubber hose in the first shape. The rubber hose may be cured/vulcanized using any suitable process, such as in an autoclave or vulcanizer.

Figure 20:
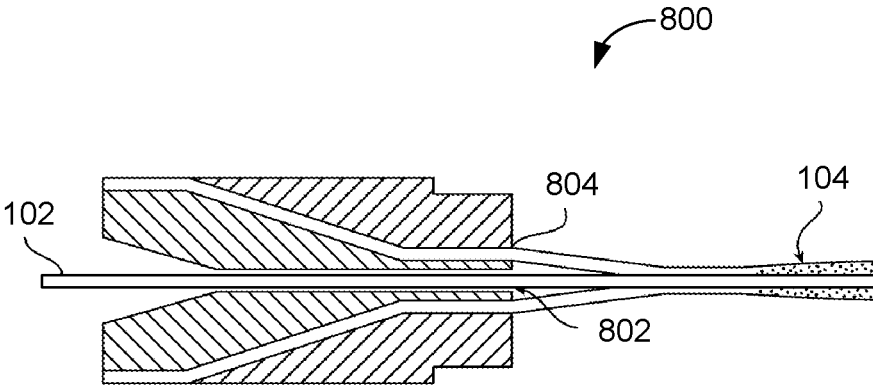
FIG. 20 is a cross-sectional view of parts of an exemplary extruder.

In some embodiments, the cured rubber hose may be surrounded by the thermoplastic layer using an extrusion process. One exemplary extrusion process is a continuous extrusion sheathing process. FIG. 20 schematically illustrates an exemplary extruder 800 that is configured to extrusion mold the thermoplastic material to form an outer tube on the cured rubber hose 102. For example, the extruder 800 includes a central passage 802 and a radially outer passage 804. The central passage is configured to allow the cured rubber hose 102 to move axially through. The radially outer passage 804 is configured to direct the thermoplastic material from a reservoir (not shown) to the cured rubber layer to form the thermoplastic layer (outer tube) surrounding the cured rubber layer 102. In some embodiments, the cured rubber hose is pre-heated prior to covering it with the thermoplastic layer. Extrusion may be conducted at a temperature above the melting point (e.g., above the melting completion temperature) of the thermoplastic material, or at any other suitable temperature for effecting extrusion of the thermoplastic material.

Other exemplary extrusion processes such as co-extrusion or tandem extrusion can be utilized if more than one thermoplastic layer of same or different material is to be extruded, and/or if a cover layer is to also be extruded.

In some embodiments, the cured rubber hose surrounded by the thermoplastic layer may be cut to length after extrusion.

As described above, the thermoplastic layer may be formed using one or more thermoplastic materials. Examples of such materials are set forth above.

Furthermore, as described above, the thermoplastic layer may be formed as a foam thermoplastic layer. The method of foaming the thermoplastic layer may be chemical and/or physical. In the chemical approach, a chemical foaming agent may be used. In the physical approach, gas may be directly used. For example, in an extrusion process, a chemical foaming agent can be used which thermally decomposes inside the extruder to yield gases such as $CO_2$, $N_2$ etc., which causes the polymer melt to expand into a foam as the polymer melt exits the extruder. In the physical foaming process a gas is directly injected at high pressures inside an extruder so that a chemical decomposition reaction is not needed to produce a foam. Prior to formation of the thermoplastic layer, one or more foaming agents may be combined with the thermoplastic material.

Examples of chemical foaming agents include, but are not limited to, Citric acid/Sodium bicarbonate, ADCA (Azodicarbonate), OBSH (p,p'-Oxybis (benzene) sulfonyl), TSH (p-Toluene sulfonyl hydrazide), TSS (p-Toluene sulfonyl semicarbazide), DNPT (Dinitrosopentamethylenetetramine), 5PT (5-Phenyitetrazole), SBH (Sodium borohydride), Magnesium carbonate ($MgCO_3$), Calcium carbonate ($CaCO_3$), Zinc carbonate ($ZnCO_3$), a combination of $MgCO_3$, $CaCO_3$, and $ZnCO_3$, tartaric acid, azodicarbonamide, a hydrazine derivative, a semi-carbazide derivative, a tetrazole derivative, a benzoxazine derivative, a metal oxide derivative or a metal carbonate derivative. The chemical foaming agent may also include a combination of any of the listed chemicals.

Examples of physical foaming agents include, but are not limited to, Propane ($C_3H_8$), n-Butane ($C_4H_{10}$), i-Butane ($CH_3(CH_3)CHCH_3$), n-pentane ($C_5H_{12}$), i-Pentane ($CH_3(CH_3)CHCH_2CH_3$), HCFC-22 ($CHF_2Cl$), HCFC-142b ($CHF_2ClCH_3$), HFC-152a ($CHF_2CH_3$), HCFC-123 ($CHCl_2CF_3$), HCFC-123a ($CHFClCF_2Cl$), HCFC-124 ($CHFClCF_3$), HFC-134a ($CH_2FCF_3$), HFC-143a ($CH_3CF_3$), CFC-11 ($CFCl_3$), CFC-12 ($CF_2Cl_2$), CFC-113 ($CFCl_2CF_2Cl$), CFC-114 ($CF_2ClCF_2Cl$), MeCl ($CH_3C_1$), $MeCl_2$ ($CH_2Cl_2$), Carbon dioxide ($CO_2$), Nitrogen ($N_2$), Oxygen ($O_2$), supercritical $CO_2$, air, helium, argon, aliphatic hydrocarbons (e.g., butanes, pentanes, hexanes, and heptanes), chlorinated hydrocarbons (e.g., dichloromethane and trichloroethylene), and hydrochlorofluorocarbons (e.g., dichlorotrifluoroethane). In another embodiment, the foaming agent includes a combination of any of the above physical foaming agents.

In yet another embodiment, the foaming agent includes a combination of any of the above chemical foaming agents and any of the above physical foaming agents.

Any suitable amount of foaming agent may be mixed with the un-foamed thermoplastic polymer. In some embodiments, the foaming agent is present in an amount ranging from 0.1 wt % to 5 wt % of the mixture. In another embodiment, the foaming agent is present in an amount ranging from 1 wt % to 4 wt % of the mixture.

In some embodiments, prior to formation of the thermoplastic layer, one or more additives may be combined with the thermoplastic material. Examples include one or more plasticizers, compatibilizers, anti-oxidants, UV stabilizers, radiopaque compounds, colorants (pigments or dyes), flow modifiers, impact modifiers, elastomers (such as in thermoplastic elastomers), cross-linked rubber (such as in thermoplastic vulcanizates), lubricants, releasing agents, coupling agents, cross-linking agents, dispersing agents, foam nucleating agents, flame retardants, reinforcing metals, minerals, nucleating agents, fillers (such as talc, clay, mica, graphite, carbon black, carbon nanotubes, graphene, silica, POSS, powdered metals, powdered ceramics, metal or ceramic based nanowires, glass fibers etc.), and/or a combination of any of the listed additives. The one or more additives may be combined with the thermoplastic material in any suitable amount. For example, the thermoplastic layer may include 2 up to 40 percent by weight of radiopaque compound such as $BaSO_4$. In another example, the thermoplastic layer may include 0.1 up to 5 percent by weight of foaming agent such as sodium bicarbonate. In another example, the thermoplastic layer may include 0.5 up to 10 percent by weight of mechanical reinforcement filler such as talc.

The one or more thermoplastic materials and the one or more foaming agents and/or additives may be combined in the extruder prior to extrusion of the thermoplastic layer.

In some embodiments, the thermoplastic layer is formed in direct contact with the cured rubber hose. It will be appreciated that in other embodiments, one or more reinforcement layers 202 or other intermediary layers may be applied to the cured rubber hose prior to extrusion. Accordingly, the thermoplastic layer may be formed such that it surrounds the cured rubber hose with the reinforcement layer disposed between the cured rubber hose and the thermoplastic layer, and the thermoplastic layer may be in direct contact with the reinforcement layer (or the other intermediary layer).

In embodiments where the thermoplastic layer is bonded to the cured rubber hose, external adhesives, glue, compatibilizers or another intermediary layer may be applied to the outer surface of the cured rubber hose before it is covered with the thermoplastic layer (e.g., before extrusion). In some embodiments, the cured rubber hose is pre-heated before it is covered with the thermoplastic layer (e.g., before extrusion). In some embodiments, the cured rubber hose may be pre-heated to a temperature in the range of 40° C.-200° C. In other embodiments, the cured rubber hose may be pre-heated to a temperature in the range of 40° C.-150° C. In other embodiments, the cured rubber hose may be pre-heated to a temperature in the range of 50° C.-100° C.

While extrusion has been described above as an exemplary process by which the cured rubber hose is surrounded by a thermoplastic layer in other embodiments, another process can be used. Examples of processes by which the cured rubber hose may be surrounded by the thermoplastic layer using a process such as injection-molding, compression molding, vacuum molding, stamping molding, calendaring, or thermoforming.

In some embodiments, the cured rubber hose surrounded with the thermoplastic layer is cooled to a temperature below the melting onset temperature of the thermoplastic material after extrusion or other processes by which the cured rubber hose may be surrounded by the thermoplastic layer. In other embodiments, the cured rubber hose surrounded with the thermoplastic layer is cooled to a temperature falling in the range of the melting onset temperature of the thermoplastic material and the melting completion temperature of the thermoplastic material after extrusion or other processes by which the cured rubber hose may be surrounded by the thermoplastic layer.

At step 1204, the cured rubber hose surrounded with the thermoplastic layer is molded into a second shape, the second shape being different than the first shape of the rubber hose. In some embodiments, molding may be conducted using a mold having a predefined geometry. The mold may be operated to form the cured rubber hose surrounded with the thermoplastic layer into the second shape. The temperature at which the molding takes place, as well as the pressure and geometric restriction applied by the mold by virtue of confining the tube within a predefined geometry, allows for the cured rubber hose surrounded with the thermoplastic layer to be conformed into the second shape. In one embodiment of the discussed process, there is an externally applied pressure along the entire length of the tube. In another embodiment, the pressure and geometric restrictions are provided at only certain sections along the length of the tube.

In some embodiments, the mold and/or the cured rubber hose surrounded with the thermoplastic layer are provided at a predetermined elevated temperature prior to molding, which may be referred to as a pre-molding temperature. The pre-molding temperature of the mold and/or the cured rubber hose surrounded with the thermoplastic layer may assist in the molding process. As described below, the pre-molding temperature may be a temperature in the range between the melting onset temperature of the thermoplastic material and the melting completion temperature of the thermoplastic material (although, depending on the presence of additives in the thermoplastic layer, the pre-molding thermoplastic layer. Similarly, any pre-molding temperatures of the mold and/or cured rubber hose surrounded with the thermoplastic layer prior to molding may be at a temperature range at which the thermoplastic layer can be molded into the second shape while also retaining the structural characteristics of the thermoplastic layer. For example, in embodiments in which the thermoplastic layer is a foam layer, the molding temperature and any pre-molding temperature may be at a temperature at which the foam structure of the thermoplastic layer is retained.

Thermoplastic materials do not have a sharp melting point like other materials such as metals. The melting behavior of thermoplastics is characterized by a wide temperature range that extends between a melting onset temperature of the thermoplastic material and the melting completion temperature of the thermoplastic material. The melting onset temperature and melting completion temperature are parameters of thermoplastic materials that are well understood by those skilled in the art. Measurement or calculation of the melting onset temperature and melting completion temperature of a given thermoplastic material can be conducted, for example, in accordance with international standards such as ASTM D3418, ASTM D3417, ISO 11357 and ISO 3146. In some embodiments, the molding temperature and any pre-molding temperature may be at a temperature between a melting onset temperature of the thermoplastic material and the melting completion temperature of the thermoplastic material, and the structural characteristics of the thermoplastic layer may be retained with the molding and pre-molding temperatures in this range.

The specific melting range varies depending upon the thermoplastic material. Exemplary ranges for different thermoplastic materials are set forth below. It will be appreciated that the particular melting onset temperatures, melting peak temperatures, and melting completion temperatures respectively set forth below are exemplary values for a given grade of material, and different grades of such materials may have different values, particularly with respect to polyurethane.

| Thermoplastic Material | Melting Onset Temperature (° C.) | Melting Peak Temperature (° C.) | Melting Completion Temperature (° C.) |
|---|---|---|---|
| Isotactic Polypropylene (PP) | 115 | 160 | 165 |
| Isotactic Polybutene (iPB) | 58 | 68 | 85 |
| Polyurethane (PU) | 125 | 155 | 180 |
| Polyamide 6, 6 (Nylon 6, 6) | 240 | 265 | 265 |
| Fluorinated Ethylene Propylene (FEP) | 240 | 265 | 285 | temperature may be above or below this range). The mold may be pre-heated to the pre-molding temperature. In embodiments where the cured rubber hose surrounded with the thermoplastic layer is cooled following extrusion or other process by which the cured rubber hose is surrounded by the thermoplastic layer, the cured rubber hose surrounded with the thermoplastic layer may be pre-heated to the pre-molding temperature. In other embodiments, the cured rubber hose surrounded with the thermoplastic layer may be cooled to the pre-molding temperature directly following extrusion or other process by which the cured rubber hose is surrounded by the thermoplastic layer.

Molding is conducted within a temperature range at which the thermoplastic layer can be molded into the second shape while also retaining the structural characteristics of the In some embodiments, the presence of one or more additives in the thermoplastic layer may allow for the pre-molding and/or molding temperature to be above or below the temperature between the melting onset temperature of the thermoplastic material and the melting completion temperature of the thermoplastic material. For example, the presence of plasticizer in the thermoplastic layer may allow for the pre-molding and/or molding temperature to be below the melting onset temperature. As another example, the presence of rigid filler such as glass filler may allow for the pre-molding and/or molding temperature to be above the melting completion temperature.

In some embodiments, the pre-molding and/or molding temperature may be in the range of 30° C.-350° C. In some embodiments, the pre-molding and/or molding temperature may be in the range of 50° C.-300° C. In some embodiments, the pre-molding and/or molding temperature may be in the range of 50° C.-200° C. In some embodiments, the pre-molding and/or molding temperature may be in the range of 100° C.-200° C. In some embodiments, the pre-molding and/or molding temperature may be in the range of 200° C.-300° C. In some embodiments, the pre-molding and/or molding temperature may be in the range of 300° C.-350° C. In some embodiments, the pre-molding and/or molding temperature may be in the range of 250° C.-300° C. In other embodiments, the pre-molding and/or molding temperature may be in the range of 200° C.-250° C. In other embodiments, the pre-molding and/or molding temperature may be in the range of 150° C.-200° C. In other embodiments, the pre-molding and/or molding temperature may be in the range of 100° C.-150° C.

In other embodiments, the pre-molding and/or molding temperature may be in the range of 50° C.-100° C. In other embodiments, the pre-molding and/or molding temperature may be in the range of 30° C.-80° C. In some embodiments, the molding temperature is the same temperature as one or both of the pre-molding temperature of the cured rubber hose surrounded with the thermoplastic layer and the pre-molding temperature of the mold. In other embodiments, the molding temperature is different than one or both of the pre-molding temperature of the cured rubber hose surrounded with the thermoplastic layer and the pre-molding temperature of the mold. In an example, the thermoplastic layer is a foamed layer formed of unfilled polypropylene, the pre-molding temperature of the cured rubber hose surrounded with the thermoplastic layer is 140° C., the pre-heat temperature of the mold is 135° C., and the molding temperature is 150° C.

The pre-heated cured rubber hose surrounded with the thermoplastic layer may be inserted into the pre-heated mold. The mold may then be operated to form the cured rubber hose surrounded with the thermoplastic layer into the second shape.

Optionally, at step 1206, one or more fittings are installed while the cured rubber hose surrounded with the thermoplastic layer is in the mold and at an elevated temperature. The elevated temperature may be a temperature in the temperature range that extends between a melting onset temperature of the thermoplastic material and the melting completion temperature of the thermoplastic material; or, for example in instances where the presence of one or more additives in the thermoplastic layer allow, may be a temperature that is above or below the temperature between the melting onset temperature of the thermoplastic material and the melting completion temperature of the thermoplastic material. In some embodiments, the one or more fittings may be installed while the cured rubber hose surrounded with the thermoplastic layer is at the molding temperature. At the elevated temperature, the thermal insulation layer is soft and can therefore relieve any circumferential or hoop stress caused by the fitting installation. This may help to prevent premature failure of the insulative layer during application. The fittings may be installed while the cured rubber hose surrounded with the thermoplastic layer is still retained in the mold so that the second shape is maintained. In other embodiments, fittings are not installed and step 1206 is omitted.

It will be appreciated that while FIG. 19 shows the optional installation of the fitting(s) subsequent to molding, in other embodiments the one or more fittings may be installed at a different point in the process when the cured rubber hose surrounded with the thermoplastic layer is at an elevated temperature (e.g., the pre-molding temperature prior to the molding taking place). The specific time at which the one or more fittings may be installed (prior to molding, during molding, or following molding with the tube assembly at an elevated temperature) is not particularly limited.

At step 1208, the cured rubber hose is maintained in the second shape with the surrounding thermoplastic layer. After the cured rubber hose surrounded with the thermoplastic layer is molded into the second shape, the tube assembly is cooled to a predetermined temperature below the molding temperature (and in some embodiments below the melting onset temperature) and removed from the mold. The cooled thermoplastic layer retains the cured rubber hose in the second shape different than the first shape. That is, the thermoplastic layer surrounds and applies a force to the cured rubber hose that causes the cured rubber hose to be retained in a shape other than the shape in which the rubber hose was cured.

Once formed, the tube assembly may be subjected to post-processing, depending on the particular tube assembly as formed and/or the particular application to which it may be applied. For example, in embodiments, where the thermoplastic layer is selectively bonded to the cured rubber hose, one or more of the non-bonded portions may be selectively removed from the tube assembly. As another example, one or more fittings may be applied to the tube assembly after removal from the mold at step 1208.

Example 1—Production of Tube Assembly

A cured rubber hose having a construction of two rubber layers each formed of nitrile rubber and a braided or coiled layer formed of polyester yarn disposed between the two rubber layers (similar to the construction shown in FIG. 3A) is subjected to continuous extrusion sheathing process in which a polyurethane resin is extruded to surround the cured rubber hose. The cured rubber hose extends linearly along its length. The inner diameter of the cured rubber hose is 1.27 cm, the outer diameter of the cured rubber hose is 2.54 cm, and the radial thickness of the thermoplastic layer is 0.635 cm. The polyurethane resin is blended with 3 wt % chemical foaming agent and the formed thermoplastic layer is extruded as a foamed layer at 185° C.

Upon extrusion, the tube assembly is cooled to 30° C. and cut to a length of 1 meter. The shape of the as-extruded tube assembly is linear between its first end and second end.

The as-extruded tube assembly is pre-heated to a pre-molding temperature of 125° C. and inserted into a mold that has also been pre-heated to a pre-molding temperature of 125° C. The molding is carried out at 150° C. to mold the tube assembly into a second shape having a curved portion.

The molded tube assembly is cooled in the mold to 45° C. and released from the mold. The tube assembly is retained in the second shape by the thermoplastic layer.

Example 2—Production of Tube Assembly with Fittings

A cured rubber hose having a construction of two rubber layers each formed of ethylene propylene diene monomer (EPDM) and a braided or coiled layer formed of polyester yarn disposed between the two rubber layers (similar to the construction shown in FIG. 3A) is subjected to continuous extrusion sheathing process in which a polypropylene resin is extruded to surround the cured rubber hose. The cured rubber hose extends linearly along its length. The inner diameter of the cured rubber hose is 0.76 cm, the outer diameter of the cured rubber hose is 1.31 cm, and the radial thickness of the thermoplastic layer is 0.27 cm. The recommended minimum bend radius of this cured rubber hose is 6.35 cm.

The polypropylene resin is blended with 2 wt % chemical foaming agent and the formed thermoplastic layer is extruded as a foamed layer at 200° C. using a continuous foam-extrusion sheathing process. Prior to be being coated with the thermoplastic layer, the cured rubber hose is pre-heated to 100° C. so that a good bond is maintained between the cured rubber hose and extruded thermoplastic foam layer. The thickness of foamed polypropylene layer is 0.97 cm.

Upon extrusion, the tube assembly is cooled to 30° C. and cut to a length of 1 meter. The shape of the as-extruded tube assembly is linear between its first end and second end.

The as-extruded tube assembly is pre-heated to 130° C. and inserted into a mold that has been pre-heated to a temperature of 135° C. The molding temperature is set at 150° C. to mold the tube assembly into a second shape having a curved portion. In the middle of the molding process, fittings are installed at the two open ends of tube assembly. The molding process is then continued to completion.

The molded tube assembly is then cooled in the mold to 45° C. and released from the mold. The tube assembly with fittings is retained in the second shape by the thermoplastic layer. One of the bends in the second shape has a radius of 5.59 cm which is 12% smaller than the bend radius of cured rubber hose without the thermoplastic layer, and another bend in the second shape has a radius of 4.14 cm which is 34.8% smaller than the bend radius of cured rubber hose without the thermoplastic layer.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of manufacturing a tube assembly, comprising:

fully curing an uncured rubber hose to form a fully cured rubber hose;

surrounding an outer surface of the fully cured rubber hose with a thermoplastic layer comprising a thermoplastic material, the fully cured rubber hose extending along a length between a first end and a second end, the fully cured rubber hose having a first shape along its length prior to surrounding the fully cured rubber hose with the thermoplastic layer, the thermoplastic layer surrounding the fully cured rubber hose along at least a portion of the length of the fully cured rubber hose;

molding the fully cured rubber hose surrounded with the thermoplastic layer into a second shape along its length, the second shape being different than the first shape of the fully cured rubber hose; and retaining the fully cured rubber hose in the second shape by the thermoplastic layer.

2. The method of claim 1, wherein the fully cured rubber hose is surrounded by the thermoplastic layer by an extrusion sheathing process.

3. The method of claim 1, wherein the thermoplastic layer retains the fully cured rubber hose at a bend radius below a minimum bend radius of the fully cured rubber hose while maintaining the cross-sectional shape of the cured rubber hose.

4. The method of claim 1, wherein molding the fully cured rubber hose surrounded with the thermoplastic layer into a second shape comprises:

installing the fully cured rubber hose surrounded with the thermoplastic layer in a mold; and molding the fully cured rubber hose surrounded with the thermoplastic layer at a molding temperature.

5. The method of claim 4, further comprising installing one or more end-fittings prior to molding the fully cured rubber hose surrounded with the thermoplastic layer provided in the second shape.

6. The method of claim 1, wherein the molding temperature is a temperature in a range from 30° C.-350° C.

7. The method of claim 1, wherein retaining the fully cured rubber hose in the second shape by the thermoplastic layer comprises cooling the cured rubber hose surrounded with the thermoplastic layer to a temperature below a molding temperature of the thermoplastic layer while maintaining the fully cured rubber hose surrounded with the thermoplastic layer in the second shape.

8. The method of claim 7, further comprising installing one or more end-fittings prior to cooling the fully cured rubber hose surrounded with the thermoplastic layer provided in the second shape.

9. The method of claim 1, wherein the thermoplastic layer is bonded to the outer surface of the fully cured rubber hose.

10. The method of claim 1, wherein the thermoplastic layer is in intimate contact with, but is unbonded to, the outer surface of the fully cured rubber hose along the entire length of the cured rubber hose.

11. The method of claim 1, wherein the fully cured rubber hose is pre-heated to a temperature of 30° C.-350° C. prior to being covered with the thermoplastic layer.

12. The method of claim 1 wherein the thermoplastic layer comprises polypropylene homopolymer or copolymer or blend or alloy or a combination thereof.

13. The method of claim 1 wherein the thermoplastic layer comprises thermoplastic polyurethane homopolymer or copolymer or blend or alloy or a combination thereof.

14. The method of claim 1, wherein the thermoplastic layer is a foam layer.

15. A tube assembly comprising:

a fully cured rubber hose extending along a length between a first end and a second end; and a thermoplastic layer surrounding the fully cured rubber hose along at least a portion of the length of the fully cured rubber hose, the thermoplastic layer comprising a thermoplastic material, wherein the fully cured rubber hose has a first shape along its length prior to surrounding the fully cured rubber hose with the thermoplastic layer, and the thermoplastic layer retains the fully cured rubber hose in a second shape different than the first shape after surrounding the fully cured rubber hose with the thermoplastic layer.

16. The tube assembly of claim 15, wherein the thermoplastic layer retains the fully cured rubber hose at a bend radius below a minimum bend radius of the fully cured rubber hose while maintaining the cross-sectional shape of the cured rubber hose.

17. The tube assembly of claim 15, wherein the thermoplastic layer comprises a polypropylene homopolymer or copolymer or blend or alloy or a combination thereof.

18. The tube assembly of claim 15, wherein the thermoplastic layer comprises a thermoplastic polyurethane homopolymer or copolymer or blend or alloy or a combination thereof.

19. The tube assembly of claim 15, wherein the thermoplastic layer is a foam layer.

20. A tube assembly comprising:

a cured rubber hose extending along a length between a first end and a second end; and a thermoplastic layer surrounding the rubber hose along at least a portion of the length of the cured rubber hose, the thermoplastic layer comprising a thermoplastic material, wherein the cured rubber hose has been fully cured in a first shape along its length and the thermoplastic layer retains the cured rubber hose in a second shape different than the first shape;

wherein the thermoplastic layer comprises a thermoplastic polyurethane homopolymer or copolymer or blend or alloy or a combination thereof.

* * * * *